(12) United States Patent  (10) Patent No.: US 7,653,049 B2
Kobayashi et al.  (45) Date of Patent: Jan. 26, 2010

(54) IP TELEPHONE SYSTEM, IP TELEPHONE APPARATUS AND CALLING METHOD

(75) Inventors: Kazuto Kobayashi, Kawasaki (JP); Akira Miyajima, Yokohama (JP)

(73) Assignee: Panasonic Corporation, Osaka (JP)

( * ) Notice: Subject to any disclaimer, the term of this patent is extended or adjusted under 35 U.S.C. 154(b) by 426 days.

(21) Appl. No.: 11/275,145

(22) Filed: Dec. 15, 2005

(65) Prior Publication Data

US 2006/0153166 A1 Jul. 13, 2006

(30) Foreign Application Priority Data

Dec. 24, 2004 (JP) ............................. 2004-373828

(51) Int. Cl.
  *H04L 12/66* (2006.01)
(52) U.S. Cl. ................................. 370/352; 379/433.06
(58) Field of Classification Search ................ 370/352; 379/433.06; 709/213, 230, 238
  See application file for complete search history.

(56) References Cited

U.S. PATENT DOCUMENTS

| 7,027,582 | B2 * | 4/2006 | Khello et al. ........... 379/220.01 |
| 2004/0133627 | A1 * | 7/2004 | Kalyanaraman et al. .... 709/201 |
| 2004/0196506 | A1 * | 10/2004 | Izumi et al. ................. 358/402 |
| 2004/0233898 | A1 | 11/2004 | Otsuka et al. |
| 2005/0226223 | A1 | 10/2005 | Kaizawa et al. |
| 2005/0281277 | A1 * | 12/2005 | Killian ....................... 370/412 |

FOREIGN PATENT DOCUMENTS

| JP | 11331435 A | * 11/1999 |
| JP | 2002-51312 | 2/2002 |
| JP | 2004-048239 | 2/2004 |
| JP | 2004-349748 | 12/2004 |
| KR | 2002-0064066 | 8/2002 |
| KR | 2004-0028333 | 4/2004 |
| WO | 2004/111749 | 12/2004 |

OTHER PUBLICATIONS

English Language Abstract of KR 2004-0028333.
English Language Abstract of KR 2002-0064066.
English Language Abstract of JP 2004-048239.

(Continued)

*Primary Examiner*—Ahmad F Matar
*Assistant Examiner*—Antim Shah
(74) *Attorney, Agent, or Firm*—Greenblum & Bernstein, P.L.C.

(57) ABSTRACT

An IP telephone system includes IP telephone apparatuses and an ENUM server. The IP telephone apparatuses, connected to an IP network, perform a voice communication. The ENUM server stores NAPTR resource records containing file transfer protocols supported by the IP telephone apparatuses and returns the NAPTR resource records, responding to a query of the IP telephone apparatuses. In the IP telephone system, when receiving a voice communication instruction from a user of a source IP telephone apparatus the source IP telephone apparatus inquires the ENUM server for NAPTR resource records of a destination IP telephone apparatus. When receiving a file transfer instruction during a voice communication, the source IP telephone apparatus transfers a file to the destination IP telephone apparatus, using a file transfer protocol specified in the NAPTR resource records.

16 Claims, 11 Drawing Sheets

OTHER PUBLICATIONS

ENUM Trial Japan, "ENUM Trial Japan First Report," May 2004, together with a partial English language translation of the same.

U.S. Appl. No. 11/183,963 to Kobayashi et al., which was filed Jul. 19, 2005.

U.S. Appl. No. 11/183,955 to Kobayashi et al., which was filed Jul. 19, 2005.

U.S. Appl. No. 11/184,899 to Kobayashi et al., which was filed Jul. 20, 2005.

Blank et al., "ENUM-Domains bei der DENIC eG", as well as an English language translation, dated Mar. 10, 2004, XP002375278, retrieved from the Internet on Mar. 29, 2006 at denic.de/media/pdf/enum/veranstaltungen.pre-reader_20040316.pdf.

Faltstrom, "E.164 number and DNS"; Request for Comments: 2916, IETF Standard, Internet Engineering Task Force, IETF, CH, dated Sep. 2000, XP015008699.

English language Abstract of JP 2004-349748, Dec. 9, 2004.

English language Abstract and partial English language translation of JP 2002-51312, Feb. 15, 2002.

Nikkei Network, Nikkei Byte saishin Network Gijyutu Taikei pp. 116-120, together with a partial English language translation, Feb. 2004.

Nikkei Byte saishin Network Gijyutu Taikei pp. 104-109, together with a partial English language translation, Aug. 2002.

\* cited by examiner

Fig.5

| ENUM domain name | | Order | Preference | Flags | Service | | URI scheme | |
|---|---|---|---|---|---|---|---|---|
| | | | | | | | | URI |
| 0.0.0.0.0.0.1.3.1.8.e164.arpa | IN NAPTR | 100 | 10 | "u" | "E2U+sip" | "!^.*$!sip:" | | 81310000000.tokyo.sip.jp " |
| | IN NAPTR | 100 | 10 | "u" | "E2U+ftp" | "!^.*$!ftp:" | | 81310000000.tokyo.sip.jp " |
| | IN NAPTR | 100 | 10 | "u" | "E2U+http" | "!^.*$!http:" | | 81310000000.tokyo.sip.jp " |
| 1.0.0.0.0.0.1.3.1.8.e164.arpa | IN NAPTR | 100 | 10 | "u" | "E2U+sip" | "!^.*$!sip:" | | 81310000001.tokyo.sip.jp " |
| | IN NAPTR | 100 | 10 | "u" | "E2U+ftp" | "!^.*$!ftp:" | | 81310000001.tokyo.sip.jp " |
| | IN NAPTR | 100 | 10 | "u" | "E2U+http" | "!^.*$!http:" | | 81310000001.tokyo.sip.jp " |

NAPTR resource record

Fig.6

| URI | IP address |
| --- | --- |
| 81310000000.tokyo.sip.jp | 192.168.1.1 |
| 81310000001.tokyo.sip.jp | 192.168.1.2 |
| 81310000002.tokyo.sip.jp | 192.168.1.3 |
| 81310000003.tokyo.sip.jp | 192.168.1.4 |

IP TELEPHONE SYSTEM, IP TELEPHONE APPARATUS AND CALLING METHOD

BACKGROUND OF THE INVENTION

1. Field of the Invention

The present invention relates to an IP telephone system, an IP telephone apparatus and a calling method that can transfer a file over an IP network.

2. Description of Related Art

With rapid growth of the Internet these days, an IP telephone system has drawn attention since the system allows low-rate calls to a telephone apparatus in a remote location and free calls between IP telephone apparatuses of subscribers. In the IP telephone system, a source IP telephone apparatus and a destination IP telephone apparatus perform call control using a call control protocol, such as SIP (Session Initiation Protocol). The IP telephone apparatuses then establish a voice communication between users using an information transfer protocol, such as RTP (Realtime Transport Protocol), for exchanging voice information.

Meanwhile, digital devices for capturing images, including a digital camera, have been exploding in popularity. Accordingly, data of images captured by the digital devices are sent to persons who are subjects of the images. A common way to send the image data is to attach the image data to e-mail.

ENUM (Telephone Number Mapping) has recently attracted attention as a technology that efficiently controls information handled by various communication tools, including telephones, facsimile machines, cellular phones, e-mail and the like, and that enables communication suitable to an environment of use. Based on identification numbers unique in the world represented by E.164, ENUM identifies services on the Internet using a DNS (Domain Name System). The IETF has been standardizing ENUM and discussing specifications of the protocol.

[Related Art 1] Japanese Patent Laid-open Publication 2004-48239

[Publication 1] The first report of ENUM Trial Japan issued by ENUM Trial Japan in May, 2004

Sending the image data and the like attached to e-mail, however, may require a long time to complete transmission. When transmission takes long, the size of the image data attached to e-mail is required to reduce.

Using a currently popular IP telephone system to transmit the image data and the like would benefit users. In the current IP telephone system, however, no function to transfer files of the image data and the like is generally available. Therefore, it is expected to provide an IP telephone system that can transfer image data files and the like.

SUMMARY OF THE INVENTION

The present invention is provided to address the above-described problems. The present invention offers an IP telephone system, an IP telephone apparatus and a calling method that can transfer a file during a voice communication with a destination IP telephone apparatus.

The present invention relates to an IP telephone system that includes IP telephone apparatuses and an ENUM server. The IP telephone apparatuses, connected to an IP network, perform a voice communication. The ENUM server stores NAPTR resource records containing file transfer protocols supported by the IP telephone apparatuses and returns the NAPTR resource records, responding to a query of the IP telephone apparatuses. In the IP telephone system, when receiving a voice communication instruction from a user of a source IP telephone apparatus, the source IP telephone apparatus inquires the ENUM server for NAPTR resource records of a destination IP telephone apparatus. When receiving a file transfer instruction during a voice communication, the source IP telephone apparatus transfers a file to the destination IP telephone apparatus, using a file transfer protocol specified in the NAPTR resource records.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 5 illustrates an example of NAPTR records stored in a database of the ENUM server according to the embodiment;

FIG. 6 illustrates an example of data stored in a database of a DNS server according to the embodiment;

DETAILED DESCRIPTION OF PREFERRED EMBODIMENTS

The embodiments of the present invention are explained in the following, in reference to the above-described drawings.

Figure 1:
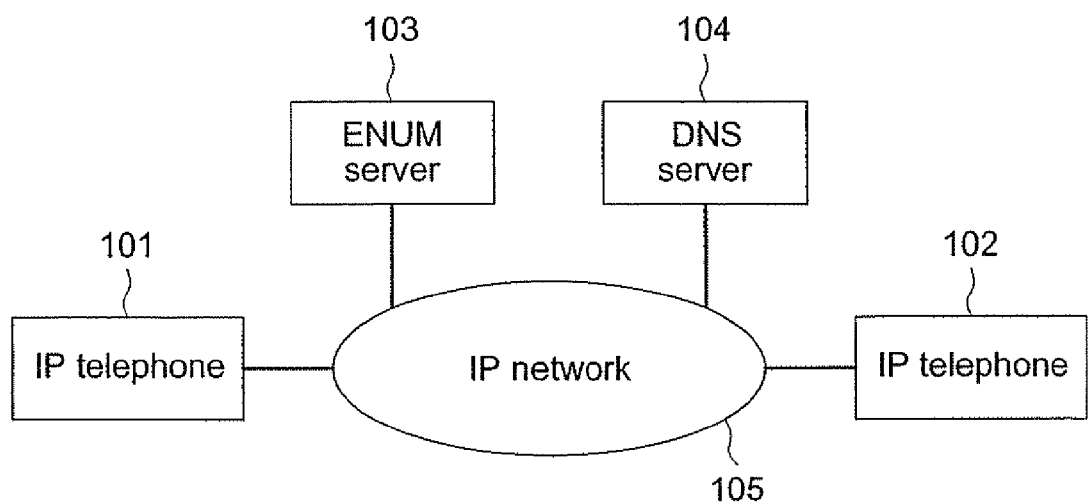
FIG. 1 illustrates a network configuration applicable to an IP telephone system according to an embodiment of the present invention.

FIG. 1 shows a network configuration applicable to an IP telephone system according to an embodiment of the present invention.

In the IP telephone system according to the embodiment, a plurality of IP telephone apparatuses (hereinafter referred to as "IP telephones") 101 and 102, ENUM server 103 and DNS server 104 interconnect via IP network 105 as shown in FIG. 1. The configuration is not limited as shown in FIG. 1: three or more IP telephones can be connected to configure the IP telephone system.

IP telephone 101 (102) has a function to perform a voice communication with another IP telephone over IP network 105. IP telephone 101 (102) further functions as a server and a client capable of file exchange, conforming to a file transfer protocol such as FTP (File Transfer Protocol). Specifically, IP telephone 101 (102) requests the another IP telephone to transfer a file based on FTP and the like. When requested by the another IP telephone to transfer a file, on the other hand, IP telephone 101 (102) transfers to the another IP telephone the file specified in the request based on FTP and the like.

ENUM server 103 has a database (DB) that stores NAPTR resource records (hereinafter referred to as "NAPTR records"), which will be described later. In response to a query (an ENUM query) from IP telephone 101 (102), ENUM server 103 returns, to IP telephone 101 (102), NAPTR records stored in the DB.

DNS server 104 has a DB that stores an IP address associated with a URI specified in NAPTR records. In response to a query from IP telephone 101 (102), DNS server 104 returns to IP telephone 101 (102) an IP address stored in the DB.

Figure 2:
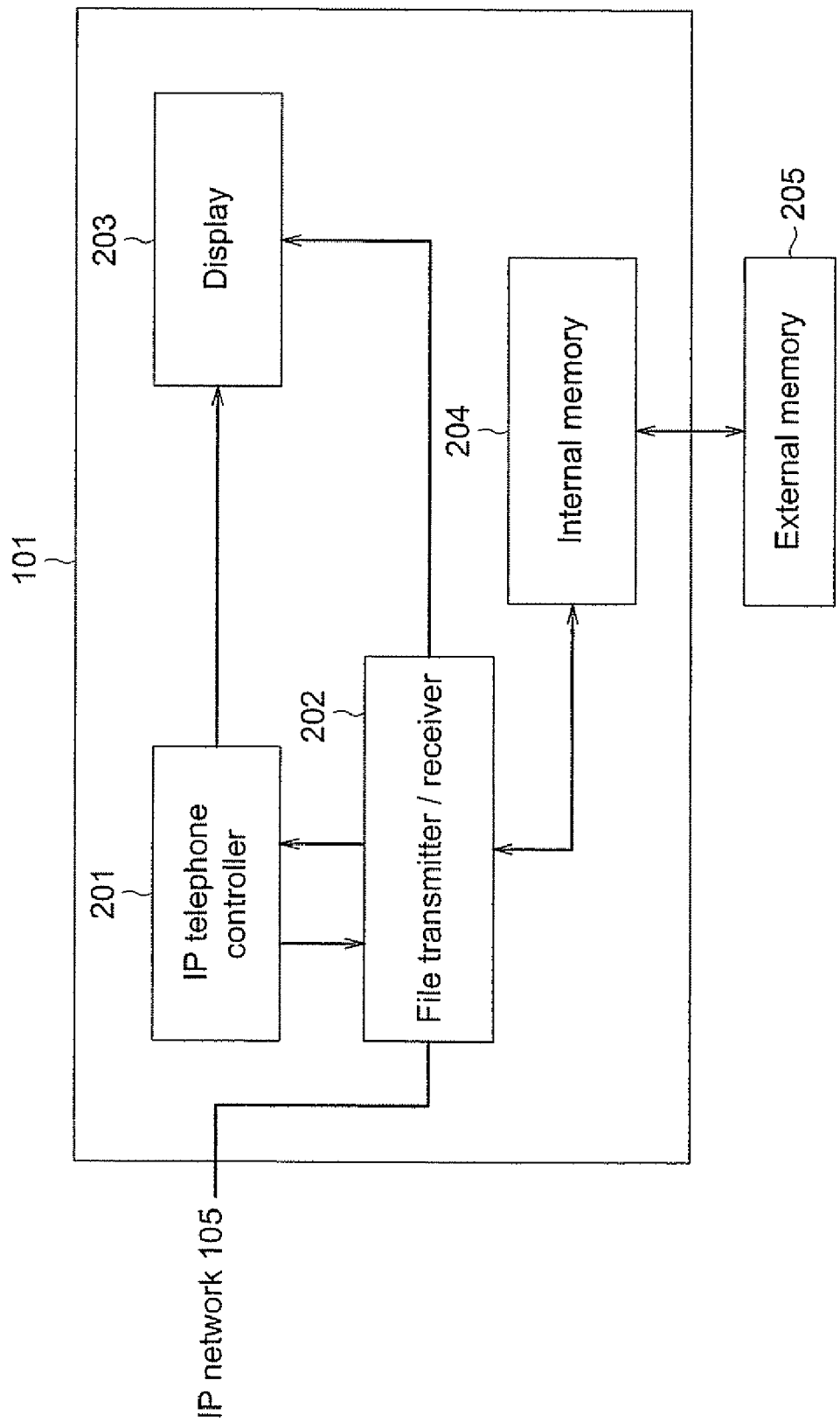
FIG. 2 illustrates a block diagram describing a general configuration of an IP telephone included in the IP telephone system according to the embodiment.

FIG. 2 is a block diagram that shows a general configuration of IP telephone 101 according to the embodiment. IP telephone 102 also has the same configuration as IP telephone 101.

In IP telephone 101 shown in FIG. 2, IP telephone controller 201 controls all operations required for a voice communication over IP network 105. IP telephone controller 201, for instance, executes call control with another IP telephone based on a call control protocol such as SIP. Further, IP telephone controller 201 transmits to ENUM server 103 an ENUM query to inquire NAPTR records associated with the another IP telephone; receives a reply to the ENUM query (an ENUM reply); transmits to DNS server 104 an IP address query to inquire an IP address of the another IP telephone; and receives a reply to the IP address query (an IP address reply).

File transmitter/receiver 202 transmits and receives a file via IP network 105 based on a file transfer protocol such as FTP. A URI and an IP address that file transmitter/receiver 202 uses for file transmission and reception are provided by IP telephone controller 201. An instruction from a user of IP telephone 101 initiates file transmission from file transmitter/receiver 202. In a description below, FTP is used as a file transfer protocol that file transmitter/receiver 202 uses, though other file transfer protocols, including TFTP (Trivial File Transfer Protocol) and HTTP (Hyper Text Transfer Protocol), are also applicable.

Display 203 includes a liquid crystal display (LCD) and the like. Display 203 displays the current status of IP telephone 101, a file to be transmitted according to an instruction from the user of IP telephone 101 and a file received. Internal memory 204 stores a file that file transmitter/receiver 202 transmits or a file that file transmitter/receiver 202 receives. External memory 205 includes a memory card such as an SD memory card (registered trademark) and the like. External memory 205 is insertable into and detachable from a card slot, which will be described later. Similar to internal memory 204, external memory 205 stores a file that file transmitter/receiver 202 transmits or a file that file transmitter/receiver 202 receives.

Figure 3:
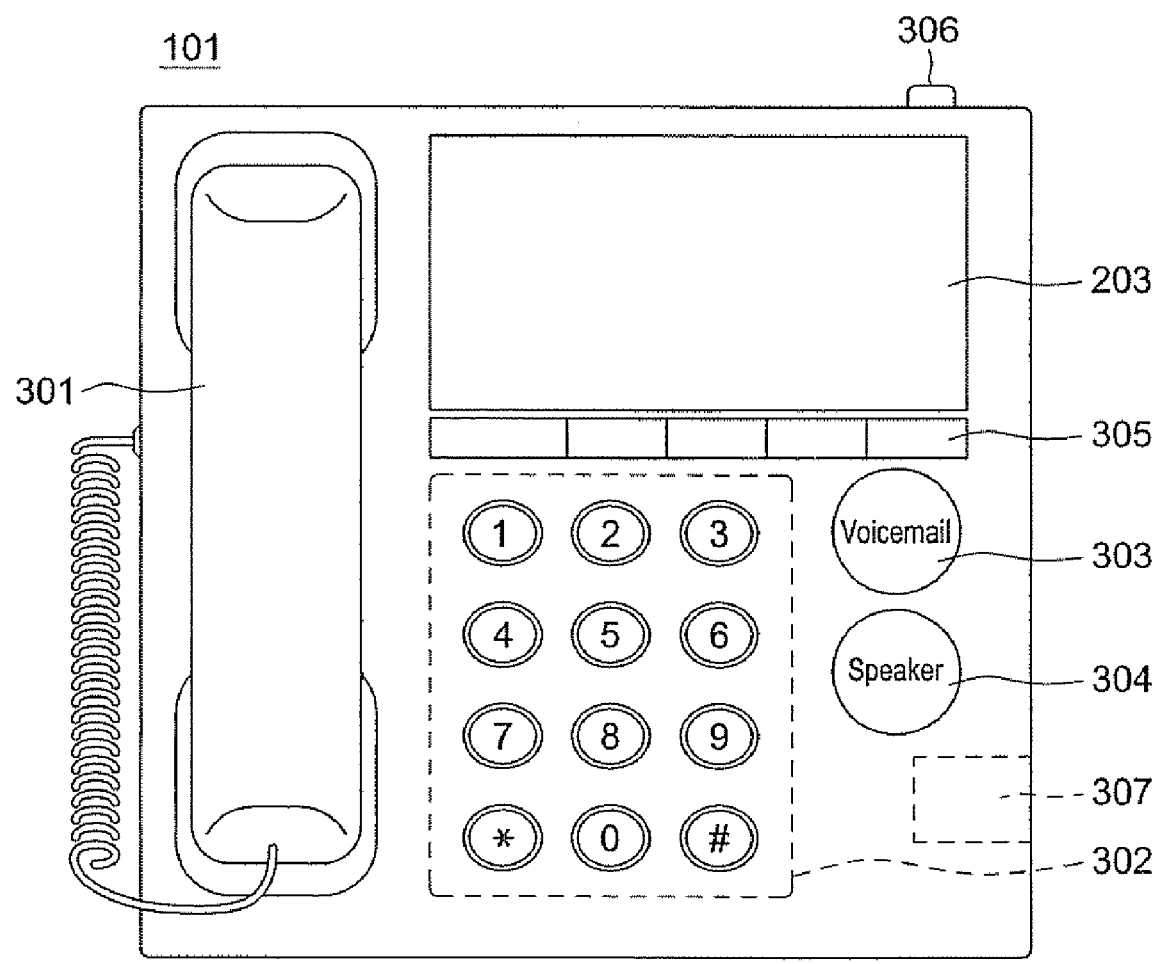
FIG. 3 illustrates an external front view of the IP telephone according to the embodiment.

FIG. 3 is an external front view of IP telephone 101 according to the embodiment. IP telephone 102 has the same layout as IP telephone 101.

As shown in FIG. 3, IP telephone 101 has handset 301 that receives a user's voice; numeric keypad 302 that allows input of a telephone number and other information; voicemail key 303, located on the right side of numeric keypad 302, that switches to voicemail mode; speaker key 304, also located on the right side of numeric keypad 302, that switches a voice to external output; and function keys 305, located on the upper side of numeric keypad 302, that include a file transfer button to instruct file transfer.

On the upper side of function keys 305, IP telephone 101 also has display 203 that includes an LCD. Equipped on the side face on the upper side of display 203 is LAN interface (LAN I/F) 306 to connect to IP network 105. On the side face on the lower right side of voicemail key 303 and speaker key 304, card slot 307 is provided to receive a memory card such as an SD memory card (registered trademark).

Figure 4:
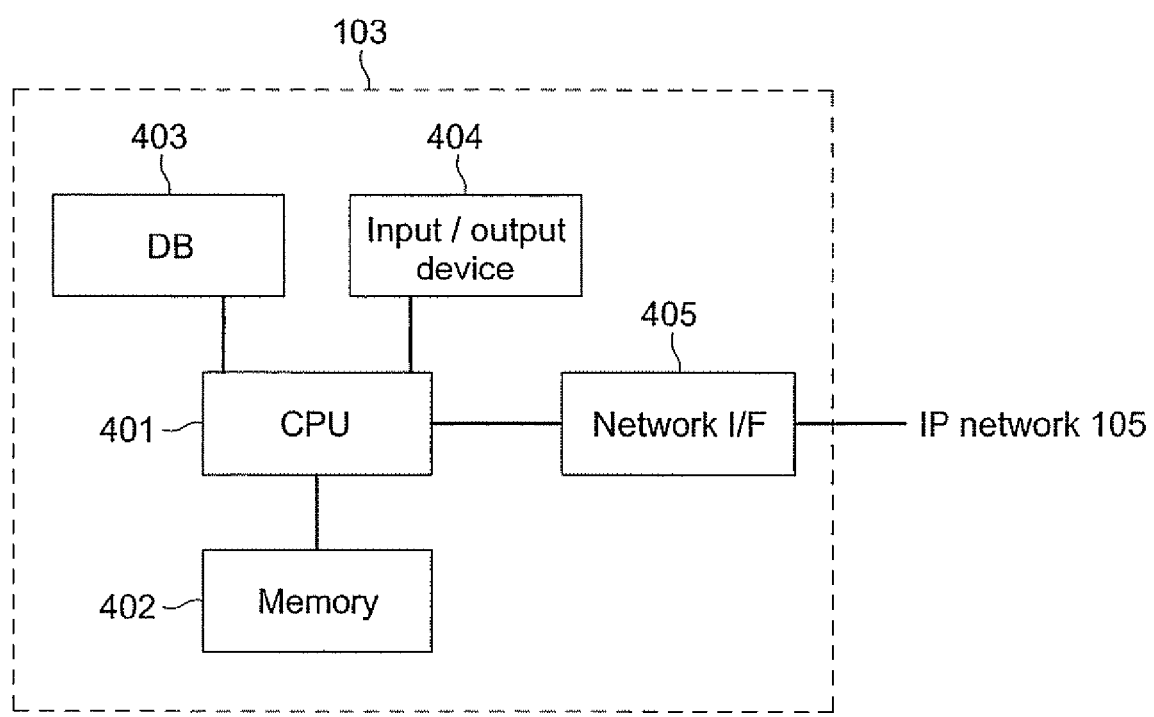
FIG. 4 illustrates a block diagram describing a representative configuration of an ENUM server in the IP telephone system according to the embodiment.

FIG. 4 is a block diagram that shows a representative example of ENUM server 103 in the IP telephone system according to the embodiment. DNS server 104 in the IP telephone system according to the embodiment also has the same configuration, except a type of data stored in a database.

As shown in FIG. 4, ENUM server 103 has CPU 401 that controls an entire server. Memory 402, which is connected to CPU 401, functions as ROM that stores a control program of ENUM server 103 that CPU 401 reads and executes. Memory 402 also functions as RAM that serves as work memory when CPU 401 executes the control program.

Also connected to CPU 401 is database (DB) 403, which stores NAPTR records to be described later. When receiving an ENUM query from IP telephone 101, for example, CPU 401 retrieves corresponding NAPTR records from data stored in DB 403 and returns the NAPTR records to IP telephone 101 that transmitted the ENUM query.

Further connected to CPU 401 is input/output device 404, which includes, for instance, an input device such as a keyboard and the like and an output device such as a display and the like. The input device is used, for example, when adding and editing data stored in DB 403; the output device is used, for example, when an administrator and the like of ENUM server 103 check data stored in DB 403.

Furthermore connected to CPU 401 is network interface (I/F) 405, an interface with IP network 105 to which ENUM server 103 hooks up.

FIG. 5 shows an example of NAPTR records stored in DB 403 of ENUM server 103 according to the embodiment. In the example, NAPTR records are stored, associated with domain names obtained from telephone numbers "0310000000" and "0310000001."

In FIG. 5, three URI's "81310000000.tokyo.sip.jp" are associated with a domain name "0.0.0.0.0.0.0.1.3.1.8.e164.arpa" obtained from the telephone number "0310000000." The three NAPTR records are different in the Service field: the first NAPTR record has a description "E2U+sip," indicating that SIP is supported; the next NAPTR record has a description "E2U+ftp," indicating that FTP is supported; and the last NAPTR record has a description "E2U+http," indicating that HTTP is supported.

Further, three URI's "81310000001.tokyo.sip.jp" are associated with a domain name "1.0.0.0.0.0.0.1.3.1.8.e164.arpa" obtained from the telephone number "0310000001." Similar to above, the three NAPTR records are different in the Service field: the first NAPTR record has a description "E2U+sip," indicating that SIP is supported; the next NAPTR record has a description "E2U+ftp," indicating that FTP is supported; and the last NAPTR record has a description "E2U+http," indicating that HTTP is supported.

The example of the NAPTR records in FIG. 5, therefore, shows that IP telephones to which the telephone numbers "0310000000" and "0310000001" are given support SIP, FTP and HTTP.

FIG. 6 shows an example of data stored in the database of DNS server 104 according to the embodiment.

In FIG. 6, the following URI's are stored: "81310000000.tokyo.sip.jp," "81310000001.tokyo.sip.jp," "81310000002.tokyo.sip.jp" and "81310000003.tokyo.sip.jp." Specifically, the URI's "81310000000.tokyo.sip.jp,"

"81310000001.tokyo.sip.jp," "81310000002.tokyo.sip.jp" and "81310000003.tokyo.sip.jp" are associated with IP addresses "192.168.1.1," "192.168.1.2," "192.168.1.3" and "192.168.1.4" respectively.

In the IP telephone system according to the embodiment having the configuration above, a user inputs a telephone number to specify a destination by using numeric keypad 302 of IP telephone 101 and makes a call with a user of the destination. During the call, the user of IP telephone 101 is able to send a selected file to the destination user by inserting into card slot 307 a memory card that stores files, using numeric keypad 302 to select a file stored in the memory card and then pressing the file transfer button in function keys 305.

Figure 7:
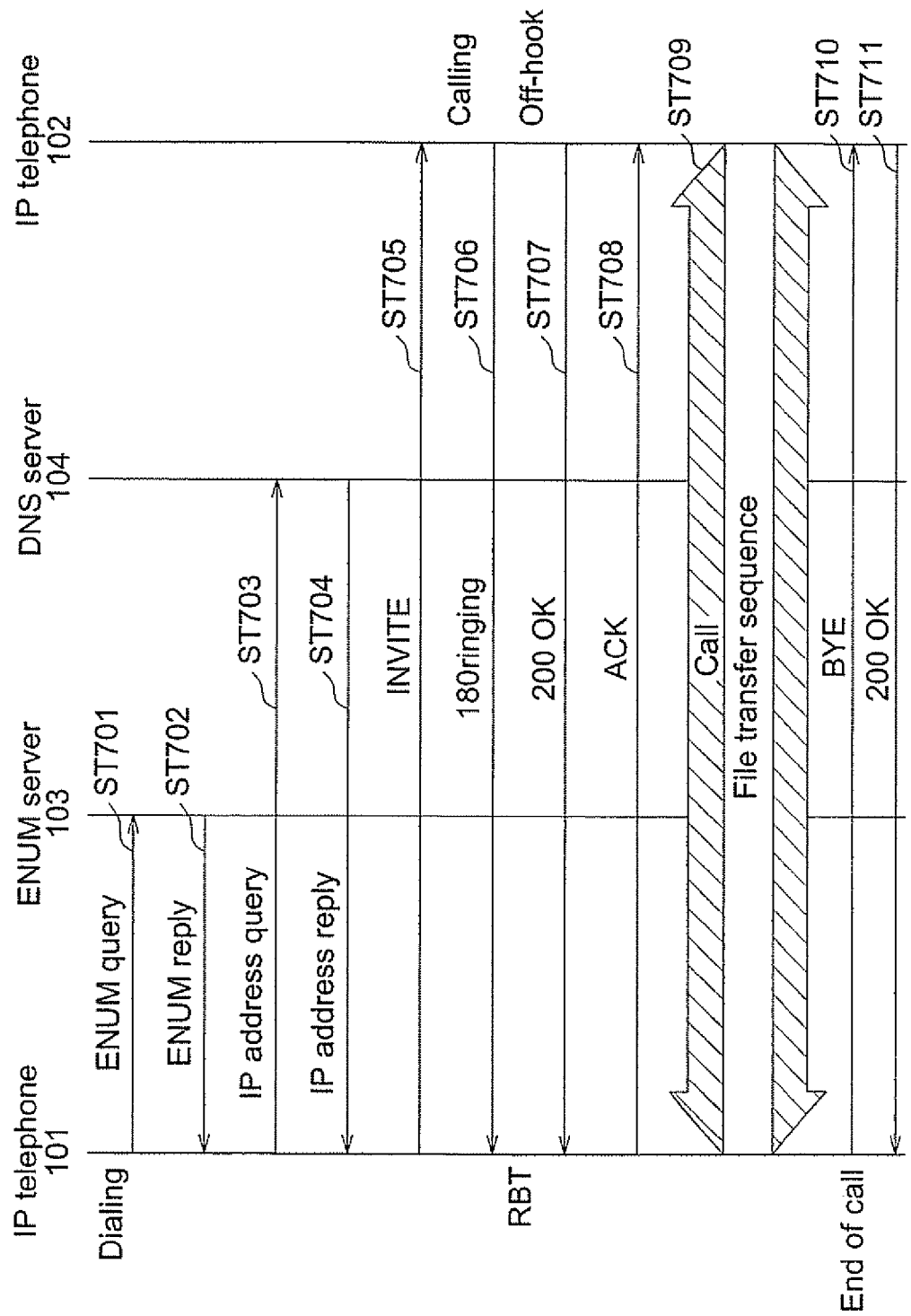
FIG. 7 illustrates a sequence diagram describing operations to establish a voice communication between IP telephones and to transfer an image data file during the voice communication in the IP telephone system according to the embodiment.

Operations of IP telephone 101 in the IP telephone system according to the embodiment are described below with reference to a sequence diagram shown in FIG. 7. The operations of IP telephone 101 include making a call with IP telephone 102 and transmitting a file during the call.

As a premise to describe the operations, DB 403 of ENUM server 103 stores the NAPTR records shown in FIG. 5 and the DB of DNS server 104 stores the data shown in FIG. 6. IP telephones 101 and 102 are provided with the telephone numbers "0310000000" and "0310000001" respectively.

In the description below, an image data file is used as a file to be transmitted. The user of IP telephone 101, for example, shoots an image using a digital camera and the like that have a memory card, such as an SD memory card (registered trademark), as a recording medium. The user then inserts the memory card containing data of the image into card slot 307 of IP telephone 101 according to the embodiment.

When IP telephone 101 communicates with IP telephone 102, the user of IP telephone 101 first inputs the telephone number "0310000001" of IP telephone 102 and instructs transmission of an ENUM query.

When receiving the telephone number and the instruction of ENUM query transmission, IP telephone 101 transmits to ENUM server 103 the ENUM query to inquire NAPTR records associated with the telephone number (ST701). In this process, IP telephone 101 first converts the telephone number "0310000001" that the user input into an E.164 number that includes a country code: "+81-3-10000001," and then keeps a mark "+" and numbers: "+81310000001." IP telephone 101 then deletes the mark "+," keeping the numbers alone, and inserts dots between the numbers: "8.1.3.1.0.0.0.0.0.0.1." Next, IP telephone 101 reverses an order of the numbers and adds a character string "e164.arpa" to the end: "1.0.0.0.0.0.0.1.3.1.8. e164.arpa." IP telephone 101 then transmits the ENUM query to inquire NAPTR records associated with the data string.

When receiving the ENUM query, ENUM server 103 retrieves the NAPTR records associated with the domain name "1.0.0.0.0.0.0.1.3.1.8. e164.arpa" and returns to IP telephone 101 an ENUM reply that includes the NAPTR records (ST702). Specifically, ENUM server 103 retrieves the lower three NAPTR records from the NAPTR records shown in FIG. 5 and returns to IP telephone 101 the ENUM reply that includes the three NAPTR records. The ENUM reply informs IP telephone 101 that IP telephone 102 supports SIP, FTP and HTTP. IP telephone controller 201 of IP telephone 101 saves the NAPTR records included in the ENUM reply.

When receiving the ENUM reply that includes the NAPTR records, IP telephone 101 transmits to DNS server 104 a query of an IP address associated with the URI "81310000001.tokyo.sip.jp" specified in the NAPTR records (ST703).

When receiving the IP address query, DNS server 104 retrieves the IP address associated with the URI and returns to IP telephone 101 an IP address reply that includes the IP address (ST704). Specifically, DNS server 104 retrieves the second IP address from the top (192.168.1.2) shown in FIG. 6 and returns to IP telephone 101 an IP address reply that includes the IP address.

When receiving the IP address reply, IP telephone 101 recognizes the IP address assigned to IP telephone 102. IP telephone 101 then transmits a message "INVITE" to the IP address of IP telephone 102 (ST705).

When receiving the message "INVITE" from IP telephone 101, IP telephone 102 rings and at the same time returns a message "180Ringing" to IP telephone 101 (ST706). Responding to the message "180Ringing," IP telephone 101 outputs a ring back tone (RBT).

When detecting one of off-hook and a reply, IP telephone 102 transmits to IP telephone 101 a message "200OK" that indicates permission to connect (ST707). When receiving the message "200OK," IP telephone 101 transmits a message "ACK" to IP telephone 102 (ST708). When IP telephone 102 receives the message "ACK," IP telephones 101 and 102 are ready to communicate and allow the users to talk (ST709).

During a call, the user of IP telephone 101 then inserts the memory card, which stores a plurality of files, selects a file to transmit from the memory card and presses the file transfer button. When detecting the pressing of the file transfer button, IP telephone 101 proceeds to a file transfer sequence where IP telephone 101 transfers the transmission file to IP telephone 102. In the file transfer sequence, IP telephone 101 transmits the transmission file to IP telephone 102, based on the NAPTR records included in the ENUM reply that IP telephone 101 previously saved. The call may continue while the file is being transferred. IP telephone 101 alternates exchange (transmission and reception) of voice packets and transmission of data in the file transfer sequence. Details on the file transfer sequence will be described later.

When completing transfer of the transmission file to IP telephone 102 through the file transfer sequence, then detecting an instruction to end the call, such as on-hook, from the user of IP telephone 101 IP telephone 101 transmits to IP telephone 102 a message "BYE" that indicates line disconnection (ST710). When receiving the message "BYE," IP telephone 102 transmits to IP telephone 101 a message "200OK" that indicates permission to disconnect (ST711). As illustrated above, the call is made between IP telephones 101 and 102 and the file is transferred during the call.

Next, the file transfer sequence above is described with reference to sequence diagrams in FIGS. 8 and 9.

Figure 8:
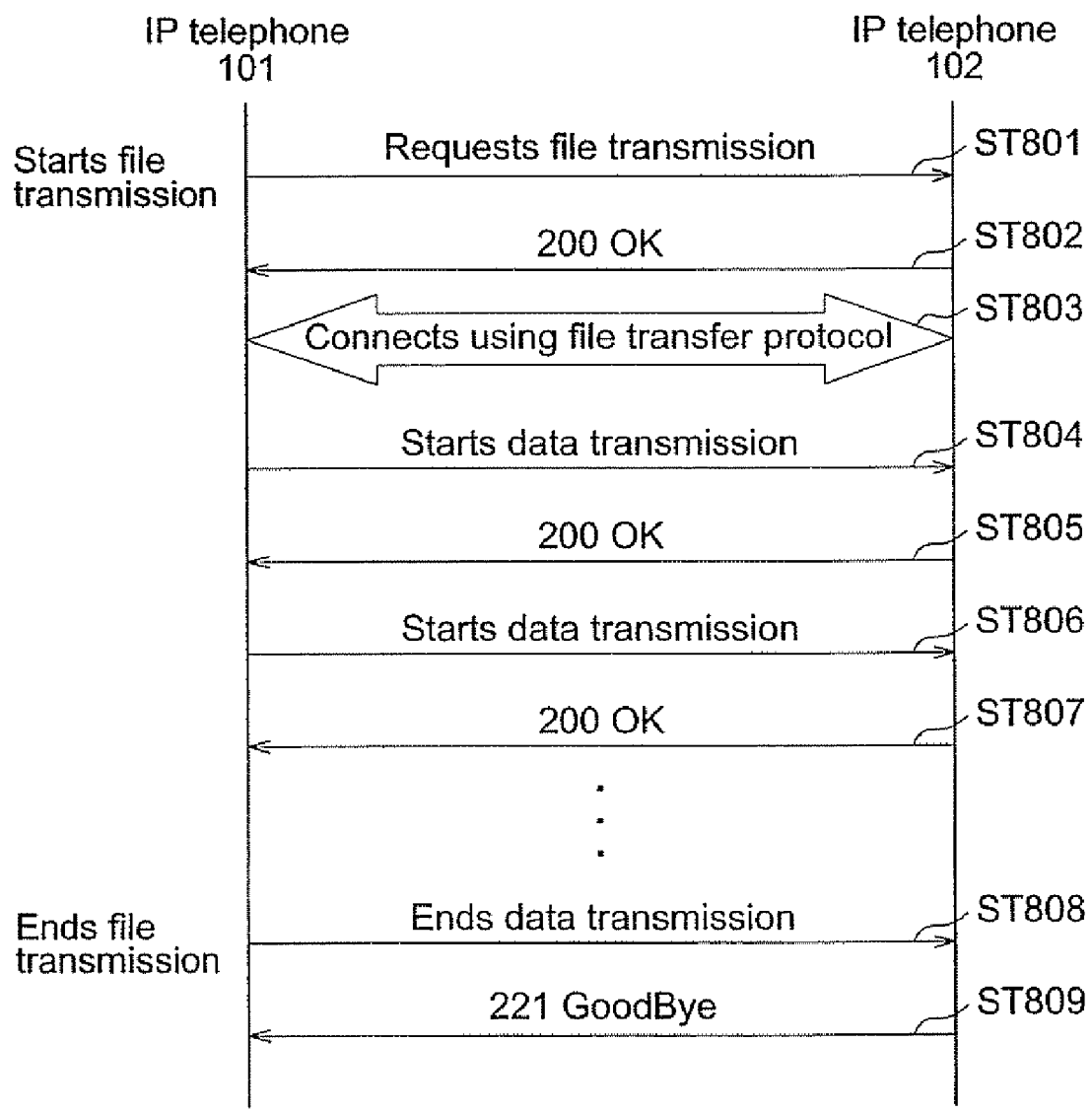
FIG. 8 illustrates a sequence diagram describing an example of the file transfer sequence shown in FIG. 7.
Figure 9:
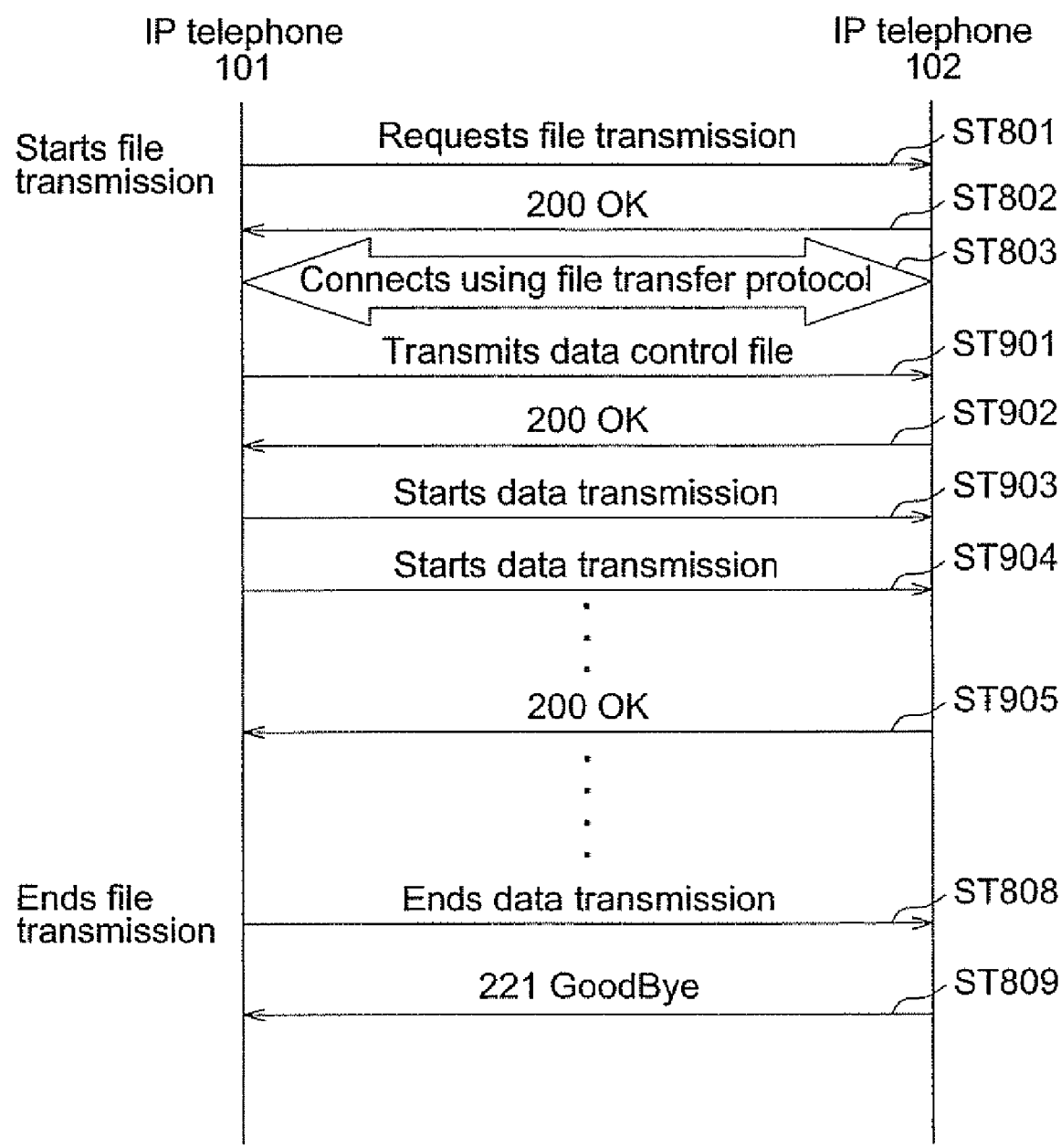
FIG. 9 illustrates a sequence diagram describing an example of the file transfer sequence shown in FIG. 7.

FIGS. 8 and 9 differ in file transmission. In a sequence shown in FIG. 8, data is transmitted per predetermined data packet and the message "200OK" is received per packet, whereas in a sequence shown in FIG. 9, a data control file, which contains information to control data transmission, is transmitted prior to data transmission and a plurality of data packets are transmitted at one time. FIG. 8 is described first, followed by FIG. 9 regarding the difference.

To proceed to the file transfer sequence, the user of IP telephone 101 specifies the transmission file and then presses the file transfer button. When the file transfer button is pressed, transmission of the specified file starts, based on a file transfer protocol in the NAPTR records included in the ENUM reply. Specifically, a file transfer protocol included in the ENUM reply that a destination (IP telephone 102) supports is selected and file transmission starts. This description uses FTP as a protocol selected from file transfer protocols (FTP and HTTP) included in the ENUM reply. For protocol selection, it is preferable in the embodiment to prioritize FTP and HTTP according to the Order field included in the NAPTR records.

Responding to the pressing of the file transfer button, IP telephone 101 transmits a file transmission request (a transmission request command) to IP telephone 102 (ST801). The file transmission request is performed by, for example, specifying "ftp" as an ID and "destination (IP telephone 102) URI" as a password based on FTP. The destination URI specified here is extracted from the NAPTR records included in the ENUM reply.

When receiving the file transmission request, IP telephone 102 transmits to IP telephone 101 a message "200OK" that indicates reception of the file transmission request (ST802). When IP telephone 101 receives the message "200OK," a connection using the file transfer protocol is established between IP telephones 101 and 102 (ST803).

When the file transfer protocol connection is established, IP telephone 101 transmits to IP telephone 102 data along with a command to start data transmission (a data transmission request command, ST804). A command "put," for example, is used as the command to start data transmission. The data is transmitted per predetermined data packet. When receiving the data for the predetermined data packet, IP telephone 102 transmits to IP telephone 101 the message "200OK" that indicates reception is completed (ST805).

When receiving the message "200OK," IP telephone 101 transmits again to IP telephone 102 data along with the command to start data transmission (ST806). When receiving the data for the predetermined data packet, IP telephone 102 transmits again to IP telephone 101 the message "200OK" that indicates reception is completed (ST807). IP telephones 101 and 102 repeat the same processes until completing data transmission of the specified file.

When completing the data transmission of the specified file, IP telephone 101 transmits to IP telephone 102 a command to end data transmission (an end command, ST808). A command "quit," for example, is used as the command to end data transmission. When receiving the command from IP telephone 101 IP telephone 102 transmits to IP telephone 101 a message "221GoodBye" that indicates reception of the command (ST809). When IP telephone 101 receives the message "221 GoodBye," the file transfer protocol connection established between IP telephones 101 and 102 is disconnected. As illustrated above, the file specified by the user of IP telephone 101 is transferred to IP telephone 102.

Similar to the file transfer sequence in FIG. 8, in the file transfer sequence in FIG. 9, returning the message "200OK" in response to the file transfer request from IP telephone 101 establishes a connection using the file transfer protocol (ST801 to ST803). The file transfer sequence in FIG. 9 differs from that in FIG. 8 in processes that follow.

When the file transfer protocol connection is established, IP telephone 101 transmits to IP telephone 102 the data control file that contains information to control data transmission before transmitting data (ST901). The data control file specifies, for instance, a quantity of data packets to transmit at one time. When receiving the data control file, IP telephone 102 transmits to IP telephone 101 the message "200OK" that indicates reception of the data control file (ST902).

When receiving the message "200OK," IP telephone 101 transmits to IP telephone 102 data along with the command to start data transmission (ST903). After transmitting the data, IP telephone 101 transmits next data along with the command to start data transmission (ST904). IP telephone 101 continues transmitting data along with the command to start data transmission until a data quantity reaches the quantity specified in the data control file. When receiving the data for the quantity specified in the data control file, IP telephone 102 transmits the message "200OK" to IP telephone 101 (ST905). IP telephones 101 and 102 repeat the same processes until completing data transmission of the specified file.

When completing the data transmission of the specified file, IP telephone 101 transmits to IP telephone 102 the command to end data transmission (the end command, ST808). When receiving the command, IP telephone 102 transmits the message "221 GoodBye" to IP telephone 101 (ST809). When IP telephone 101 receives the message "221 GoodBye," the file transfer protocol connection established between IP telephones 101 and 102 is disconnected. As illustrated above, the file specified by the user of IP telephone 101 is transferred to IP telephone 102.

Figure 10:
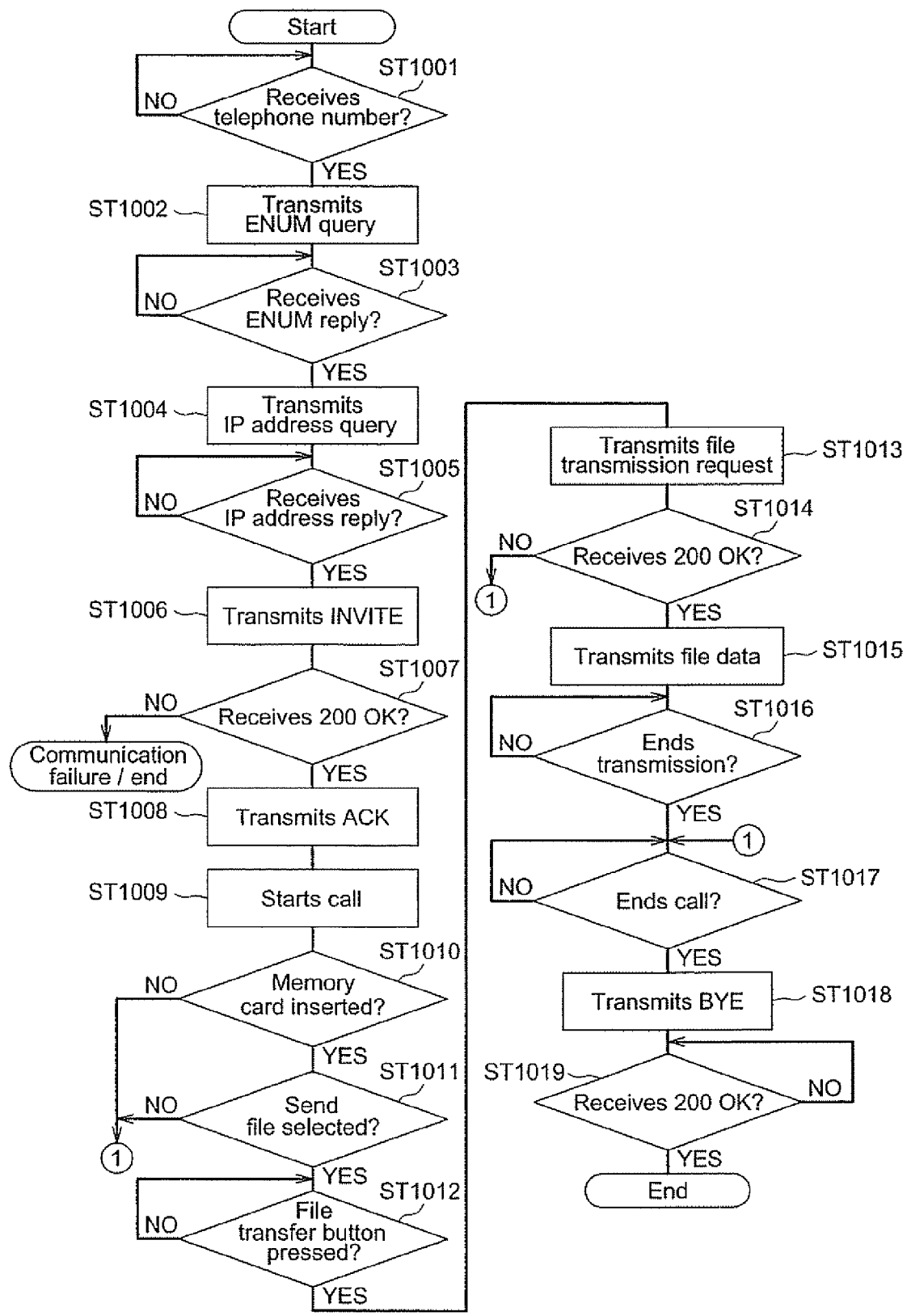
FIG. 10 illustrates a flowchart describing operations of a source IP telephone in the sequences shown in FIGS. 7 and 8 (9)
Figure 11:
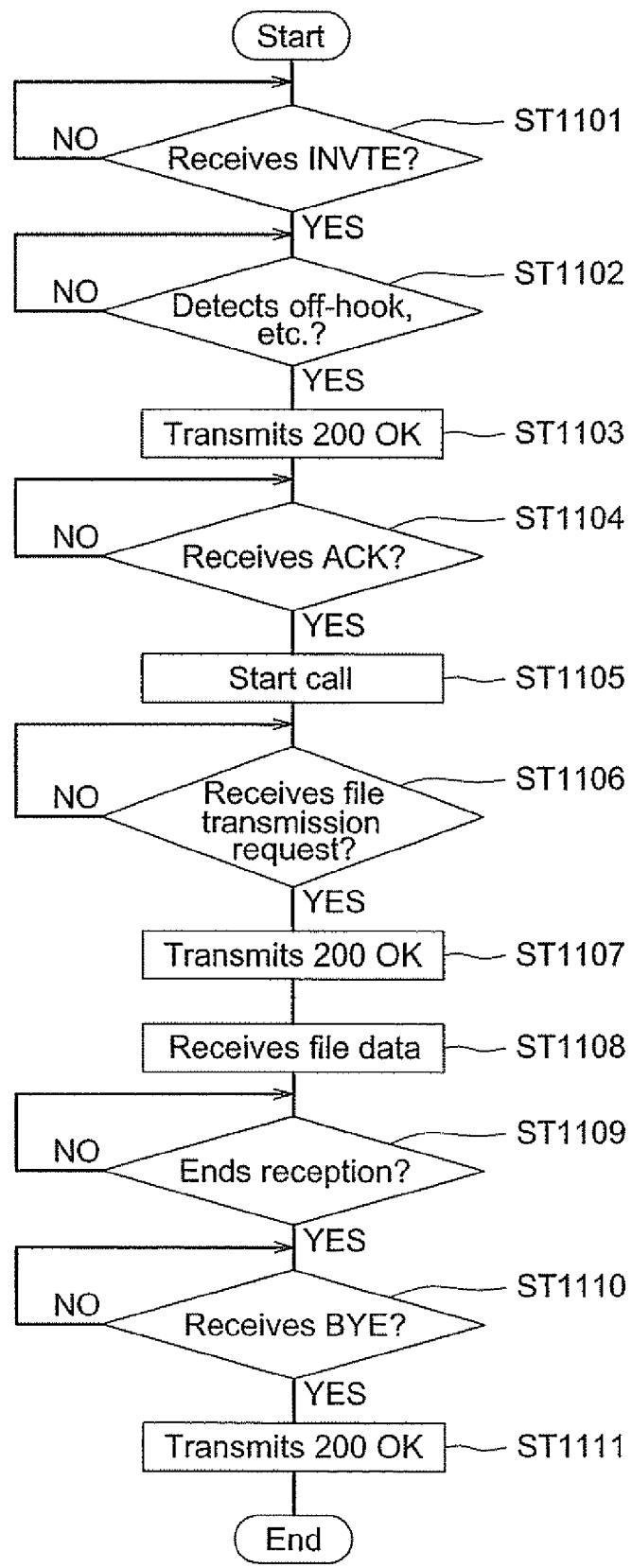
FIG. 11 illustrates a flowchart describing operations of a destination IP telephone in the sequences shown in FIGS. 7 and 8 (9).

Operations of source IP telephone 101 and destination IP telephone 102 in the sequences shown in FIGS. 7 and 8 (FIG. 9) are described below. FIG. 10 is a flowchart that shows the operations of source IP telephone 101 in the sequences shown in FIGS. 7 and 8 (FIG. 9); FIG. 11 is a flowchart that shows the operations of destination IP telephone 102 in the sequences shown in FIGS. 7 and 8 (FIG. 9).

As FIG. 10 shows, source IP telephone 101 in standby mode monitors reception of telephone number input from the user (ST1001). When receiving telephone number input, IP telephone 101 transmits the ENUM query to ENUM server 103 (ST1002) and monitors reception of the ENUM reply (ST1003). IP telephone 101 continues monitoring for a predetermined time. When unable to confirm the ENUM reply, IP telephone 101 determines that communication failed and terminates the process (not shown in the figure).

When confirming the ENUM reply, IP telephone 101 transmits the IP address query to DNS server 104 (ST1004) and monitors reception of the IP address reply (ST1005). IP telephone 101 continues monitoring for a predetermined time. When unable to confirm the IP address reply, IP telephone 101 determines that communication failed and terminates the process (not shown in the figure).

When confirming the IP address reply, IP telephone 101 transmits the message "INVITE" to the IP address of IP telephone 102 obtained in the IP address reply (ST1006). Then, IP telephone 101 monitors reception of the message "200OK" from destination IP telephone 102 (ST1007).

When confirming the message "200OK" IP telephone 101 transmits the message "ACK" to IP telephone 102 (ST1008). IP telephone 101 continues monitoring for a predetermined time. When unable to confirm the message "200OK," IP telephone 101 determines that communication failed and terminates the process. When IP telephone 102 confirms the message "ACK" that IP telephone 101 transmitted, the users of the IP telephones start a call (ST1009).

When the call starts, IP telephone 101 determines whether the user transfers to IP telephone 102 a file stored in a memory card, which contains a plurality of files. Specifically, IP telephone 101 first determines whether the memory card is inserted into card slot 307 (ST1010). When the memory card is inserted, IP telephone 101 determines whether a file for transmission is selected using numeric keypad 302 and the like (ST1011). When the file for transmission is selected, IP telephone 101 determines whether the file transfer button is pressed (ST1012).

One of when no memory card is inserted in ST1010 and when no file for transmission is selected in ST1011, IP telephone 101 skips to ST1017, whose process will be described later, and determines whether the call ends. When the file transfer button is not pressed in ST1012, IP telephone 101 continues monitoring until the file transfer button is pressed.

When the file transfer button is pressed, IP telephone 101 transmits the file transmission request to IP telephone 102 (ST1013). When transmitting the file transmission request, file transmitter/receiver 202 of IP telephone 101 transmits the file transmission request based on the file transfer protocol in the NAPTR records included in the ENUM reply.

In this description, file transfer starts based on the lower three NAPTR records shown in FIG. 5. Specifically, file transmitter/receiver 202 selects a protocol, one of FTP and HTTP, from the NAPTR records and starts transferring the file. For protocol selection, it is preferable in the embodiment to prioritize FTP and HTTP according to the Order field included in the NAPTR records.

In this description, file transmitter/receiver 202 selects FTP, based on which file transmitter/receiver 202 starts transferring the file. Specifically, file transmitter/receiver 202, controlled by IP telephone controller 201, specifies "ftp" as the ID and "IP telephone 102 URI" as the password based on FTP. Then, file transmitter/receiver 202 is able to specify a destination of the file for transmission based on FTP, using information of the other party obtained in the call control process. The IP telephone 102 URI is extracted from the NAPTR records included in the ENUM reply.

After transmitting the file transmission request, IP telephone 101 monitors reception of the message "200OK" from IP telephone 102 (ST1014). When confirming the message "200OK," IP telephone 101 transmits file data to IP telephone 102 (ST1015). IP telephone 101 continues monitoring for a predetermined time. When unable to confirm the message "200OK," IP telephone 101 determines that file transfer failed, skips to ST1017, whose process will be described later, and determines whether the call ends.

While transmitting the file data, IP telephone 101 monitors an end of file data transmission (ST1016). When detecting the end of file data transmission, IP telephone 101 monitors an end of call (ST1017). When detecting the end of call, IP telephone 101 transmits the message "BYE" to IP telephone 102 (ST1018), then monitors reception of the message "200OK" from IP telephone 102 (ST1019). When confirming the message "200OK," IP telephone 101 ends the process to transmit the file during the call. As illustrated above, the file specified by the user of IP telephone 101 is transmitted to IP telephone 102.

Meanwhile, as FIG. 11 shows, destination IP telephone 102 in standby mode monitors reception of the message "INVITE" from the source IP telephone (IP telephone 101 in this description, ST1101). When receiving the message "INVITE," IP telephone 102 rings and determines reception of a reply such as off-hook from the user (ST1102). When receiving the reply such as off-hook from the user, IP telephone 102 transmits the message "200OK" to IP telephone 101 (ST1103). When receiving no reply such as off-hook from the user, IP telephone 102 continues monitoring of ST1102.

After transmitting the message "200OK" to IP telephone 101, IP telephone 102 monitors reception of the message "ACK" from IP telephone 101 (ST1104). When IP telephone 102 confirms the message "ACK," the users of the IP telephones start a call (ST1105). When not receiving the message "ACK" from IP telephone 101, IP telephone 102 continues monitoring of ST1104.

When the call starts, IP telephone 102 determines whether a file is transferred from IP telephone 101. Specifically, IP telephone 102 determines reception of the file transmission request from IP telephone 101 (ST1106). When confirming the file transmission request, IP telephone 102 transmits the message "200OK" to IP telephone 101 (ST1107). When receiving the message "200OK," IP telephone 101 starts transmitting the file data and IP telephone 102 receives the file data (ST1108).

While receiving the file data, IP telephone 102 monitors an end of file data reception (ST1109). When detecting the end of file data reception, IP telephone 102 determines reception of the message "BYE" from IP telephone 101 (ST1110). When confirming the message "BYE," IP telephone 102 transmits the message "200OK" to IP telephone 101 (ST1111). When transmitting the message "200OK," IP telephone 102 ends the process to receive file transfer during the call. As illustrated above, the file specified by the user of IP telephone 101 is received by IP telephone 102.

In the IP telephone system according to the embodiment as described above, the source IP telephone (IP telephone 101) uses the file transfer protocol specified in the NAPTR records, which are returned in response to the ENUM query based on the call instruction from the user, and transfers the file to the destination IP telephone (IP telephone 102). Thereby, the source IP telephone is able to transfer the file to the destination IP telephone during the call.

Further in the IP telephone system according to the embodiment, the source IP telephone (IP telephone 101) closes the connection established with the destination IP telephone (IP telephone 102) when receiving the instruction to end the call after completing file transfer to the destination IP telephone (IP telephone 102). Thus, the connection established with the destination IP telephone (IP telephone 102) can surely be cut off based on the instruction to end the call.

The embodiment describes a case where the file is transferred during the call between IP telephones 101 and 102 and the call ends after the file transfer ends. Depending on the size of file data, however, it may take longer to complete file transfer. It is, therefore, preferable as an embodiment to control file transfer so that the file transfer starts during a call and continues after the call ends. To perform the file transfer as above, a connection needs to be maintained even when the user provides the instruction to end the call such as on-hook. The connection can be maintained even when the instruction to end the call is provided, for example, by setting the IP telephone not to transmit the message "BYE" responding to the instruction to end the call such as off-hook, but to transmit the message "BYE" when detecting an end of file transfer.

The source IP telephone (IP telephone 101) can be set as described above so as to maintain the connection established with the destination IP telephone (IP telephone 102) until completing file transfer to the destination IP telephone (IP telephone 102) when instructed to end the call before ending the file transfer. Then, the user can end the call by setting the IP telephone to on-hook without waiting for completion of the file transfer.

Further, the embodiment describes a case where the file is transferred based on FTP in the file transfer sequence. However, another file transfer protocol such as HTTP can replace FTP. When transferring the file based on HTTP, a command "request-URI" as the file transmission request (the transmission request command) and a command "POST" as the command to start data transmission (the data transmission request command) shown in FIG. 5 (FIG. 6) may be used.

TFTP can also be used as a file transfer protocol for file transfer. Unlike FTP, which uses TCP in a transport layer, TFTP uses UDP in the transport layer. The protocol thus does not require establishment of a connection with the destination IP telephone prior to file transfer, thereby reducing overhead except for file transfer and achieving efficient file transfer.

The description above illustrates a case when the memory card is inserted into memory card slot 307 during the call between IP telephones 101 and 102 and the file stored in the memory card is transferred. When transmitting the file in the memory card, however, the memory card needs not to be inserted into memory card slot 307 during the call, but can be inserted before the call. Further, a file stored in internal memory 204 of IP telephone 101 can be transferred.

The IP telephone, described as a standalone apparatus in the IP telephone system according to the embodiment, can have a different configuration. For example, a control adapter can be connected to a standard telephone apparatus so that the standard telephone apparatus functions as an IP telephone. The standard telephone apparatus is defined here as a telephone apparatus having no calling function via IP network 104.

The IP telephone, described as a calling apparatus in the IP telephone system according to the embodiment, can be an IP video telephone that bi-directionally communicates not only voices but also motion images on a real time basis.

The display, incorporated into the IP telephone in the IP telephone system according to the embodiment, can be separated from the IP telephone.

In the IP telephone system according to the embodiment, transmission and reception of voice packets for a call can be suspended during file transfer, while a call control sequence for the call is maintained, in order to give priority to data transmission for the file transfer and to reduce communication traffic with the other party, thereby improving file transfer efficiency.

A type of a file for transfer in the IP telephone system according to the embodiment is not limited to image data, but can be any type.

The embodiment of the IP telephone system describes a case where file transfer starts after the connection is established, that is, the destination IP telephone is set to off-hook. However, the IP telephone can have an auto reply function to allow establishment of SIP call control for file transmission even when the destination user is unavailable.

The IP telephone in the description above includes an IP telephone defined by a government and operated by a telecommunications carrier, and an IP telephone using a computer communication protocol, such as TCP/IP, and working on a local area network or a private network.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-373828 filed on Dec. 24, 2004, entire content of which is expressly incorporated by reference herein.

What is claimed is:

1. An IP (Internet Protocol) telephone apparatus connected to an ENUM (Telephone Number Mapping) server, the ENUM server storing a NAPTR (Naming Authority Pointer) resource record including a plurality of available protocols among which one is selected and utilized for transmitting a data file, of another IP telephone apparatus, the IP telephone apparatus comprising:
    a memory slot configured to receive a memory card, the memory card being insertable into the memory slot, the memory card being configured to store a data file;
    a file transmitter configured to transmit the data file via an IP network based on a predetermined protocol, during a call with the another IP telephone apparatus, by alternating transmission of data in the data file to the another IP telephone apparatus and exchange of voice packets for the call with the another IP telephone apparatus;
    a file transfer button; and
    a controller configured to:
        access the ENUM server to obtain the NAPTR resource record of the another IP apparatus;
        determine whether the NAPTR resource record indicates that the another IP telephone apparatus can use the predetermined protocol according to the available protocol of the NAPTR resource record; and
        cause the transmitter to transmit, to the another IP telephone apparatus, the data file stored in the memory card, using the predetermined protocol, during the call with the another IP telephone apparatus by alternating transmission of the data in the data file to the another IP telephone apparatus and exchange of voice packets for the call with the another IP telephone apparatus, when it is determined that the another IP telephone apparatus can use the predetermined protocol,
    wherein the predetermined protocol for transmitting the data file is selected from the plurality of available protocols and transmission of the data file is initiated when the file transfer button is pressed during the call with the another IP telephone apparatus.

2. The IP telephone apparatus according to claim 1, further comprising:
    a key pad configured to input a telephone number of the another IP telephone apparatus, wherein the NAPTR resource record includes an ENUM domain name corresponding to a URI, and when the controller accesses the ENUM server, the controller generates the ENUM domain name based on the input telephone number of the another IP telephone apparatus, transmits to the ENUM server a request for transmitting to the IP telephone apparatus the NAPTR resource record corresponding to the generated ENUM domain name, and receives the corresponding NAPTR resource record.

3. The IP telephone apparatus according to claim 1, wherein the memory stores a plurality of programs for performing a plurality of types of predetermined protocols, and one of the plurality of types of predetermined protocols is selected for the transmission of the data file to the another IP telephone apparatus when the file transfer button is pressed.

4. The IP telephone apparatus according to claim 3, wherein the plurality of types of predetermined protocols comprise one of a FTP (File Transfer Protocol), a TFTP (Trivial File Transfer Protocol) and a HTTP (Hypertext Transfer Protocol).

5. The IP telephone apparatus according to claim 1,
wherein the controller disconnects the line with the another IP telephone apparatus, when a termination of a communication with the another IP telephone apparatus is indicated after the transmission of the data file to the another IP telephone apparatus is completed.

6. The IP telephone apparatus according to claim 5,
wherein the controller maintains the connection with the another IP telephone apparatus until the transmission of the data file to the another IP telephone apparatus is completed, when a termination of a communication with the another IP telephone apparatus is indicated before the transmission of the data file to the another IP telephone apparatus is completed.

7. The IP telephone apparatus according to claim 1,
wherein the controller begins alternating the transmission of the data in the data file to the another IP telephone apparatus and the exchange of the voice packets for the call with the another IP telephone apparatus, when transmission of the data file to the another IP telephone apparatus is requested during the call with the another IP telephone apparatus.

8. The IP telephone apparatus according to claim 1,
wherein the data file comprises image data.

9. The IP telephone apparatus according to claim 8,
wherein the another IP telephone apparatus comprises a display and displays the image data included in the received data file on the display.

10. An IP (Internet Protocol) telephone system, comprising:
an IP telephone apparatus; and
an ENUM (Telephone Number Mapping) server configured to store a NAPTR (Naming Authority Pointer) resource record including a plurality of available protocols among which one is selected and utilized for transmitting a data file, of another IP telephone apparatus,
the IP telephone apparatus further comprising:
a memory slot configured to receive a memory card, the memory card being insertable into the memory slot, the memory card being configured to store a data file;
a file transmitter configured to transmit the data file via an IP network based on a predetermined protocol, during a call with the another IP telephone apparatus, by alternating transmission of data in the data file to the another IP telephone apparatus and exchange of voice packets for the call with the another IP telephone apparatus;
a file transfer button; and
a controller configured to:
access the ENUM server to obtain the NAPTR resource record of the another IP apparatus;
determine whether the NAPTR resource record indicates that the another IP telephone apparatus can use the predetermined protocol according to the available protocol of the NAPTR resource record; and
cause the transmitter to transmit, to the another IP telephone apparatus, the data file stored in the memory card, using the predetermined protocol, during the call with the another IP telephone apparatus by alternating transmission of the data in the data file to the another IP telephone apparatus and exchange of voice packets for the call with the another IP telephone apparatus, when it is determined that the another IP telephone apparatus can use the predetermined protocol,
wherein the predetermined protocol for transmitting the data file is selected from the plurality of available protocols and transmission of the data file is initiated when the file transfer button is pressed during the call with the another IP telephone apparatus.

11. The IP telephone system according to claim 10,
wherein the controller disconnects the line with the another IP telephone apparatus, when a termination of a communication with the another IP telephone apparatus is indicated after the transmission of the data file to the another IP telephone apparatus is completed.

12. The IP telephone system according to claim 11,
wherein the controller maintains the connection with the another IP telephone apparatus until the transmission of the data file to the another IP telephone apparatus is completed, when a termination of a communication with the another IP telephone apparatus is indicated before the transmission of the data file to the another IP telephone apparatus is completed.

13. A method for calling using an IP (Internet Protocol) telephone apparatus, the IP telephone apparatus comprising a memory slot configured to receive a memory card, the memory card being insertable into the memory slot, the memory card being configured to store a data file, the IP telephone apparatus further comprising a file transfer button and a file transmitter configured to transmit a data file via an IP network based on a predetermined protocol, during a call with the another IP telephone apparatus, by alternating transmission of data in the data file to the another IP telephone apparatus and exchange of voice packets for the call with the another IP telephone apparatus, the IP telephone apparatus being connected to an ENUM (Telephone Number Mapping) server, the ENUM server storing a NAPTR (Naming Authority Pointer) resource record including a plurality of available protocols among which one is selected and utilized for transmitting the data file, of the another IP telephone apparatus, the method comprising:
accessing the ENUM server to obtain the NAPTR resource record of the another IP telephone apparatus;
determining whether the NAPTR resource record indicates that the another IP telephone apparatus can use the predetermined protocol according to the available protocol of the NAPTR resource record; and
transmitting, to the another IP telephone apparatus, the data file stored in the memory card, using the predetermined protocol, during the call with the another IP telephone apparatus by alternating transmission of the data in the data file to the another IP telephone apparatus and exchange of voice packets for the call with the another IP telephone apparatus, when it is determined that the another IP telephone apparatus can use the predetermined protocol,
wherein the predetermined protocol for transmitting the data file is selected from the plurality of available protocols and transmission of the data file is initiated when the file transfer button is pressed during the call with the another IP telephone apparatus.

14. The method according to claim 13, further:
comprising disconnecting the line with the another IP telephone apparatus, when a termination of a communication with the another IP telephone apparatus is indicated after the transmission of the data file to the another IP telephone apparatus is completed.

15. The method according to claim 14, further comprising:
holding the line with the another IP telephone apparatus until the transmission of the data file to the another IP telephone apparatus is completed, when a termination of a communication with the another IP telephone apparatus is indicated before the transmission of the data file to the another IP telephone apparatus is completed.

16. The method according to claim 13, further comprising:
alternating the transmission of the data in the data file to the another IP telephone apparatus and the exchange of the voice packets for the call with the another IP telephone apparatus, beginning when transmission of the data file to the another IP telephone apparatus is indicated during the call with the another IP telephone apparatus.

* * * * *